Oct. 3, 1961 — J. PAVLECKA — 3,002,717
AIRFOIL STRUCTURE
Filed Jan. 12, 1960 — 3 Sheets-Sheet 1
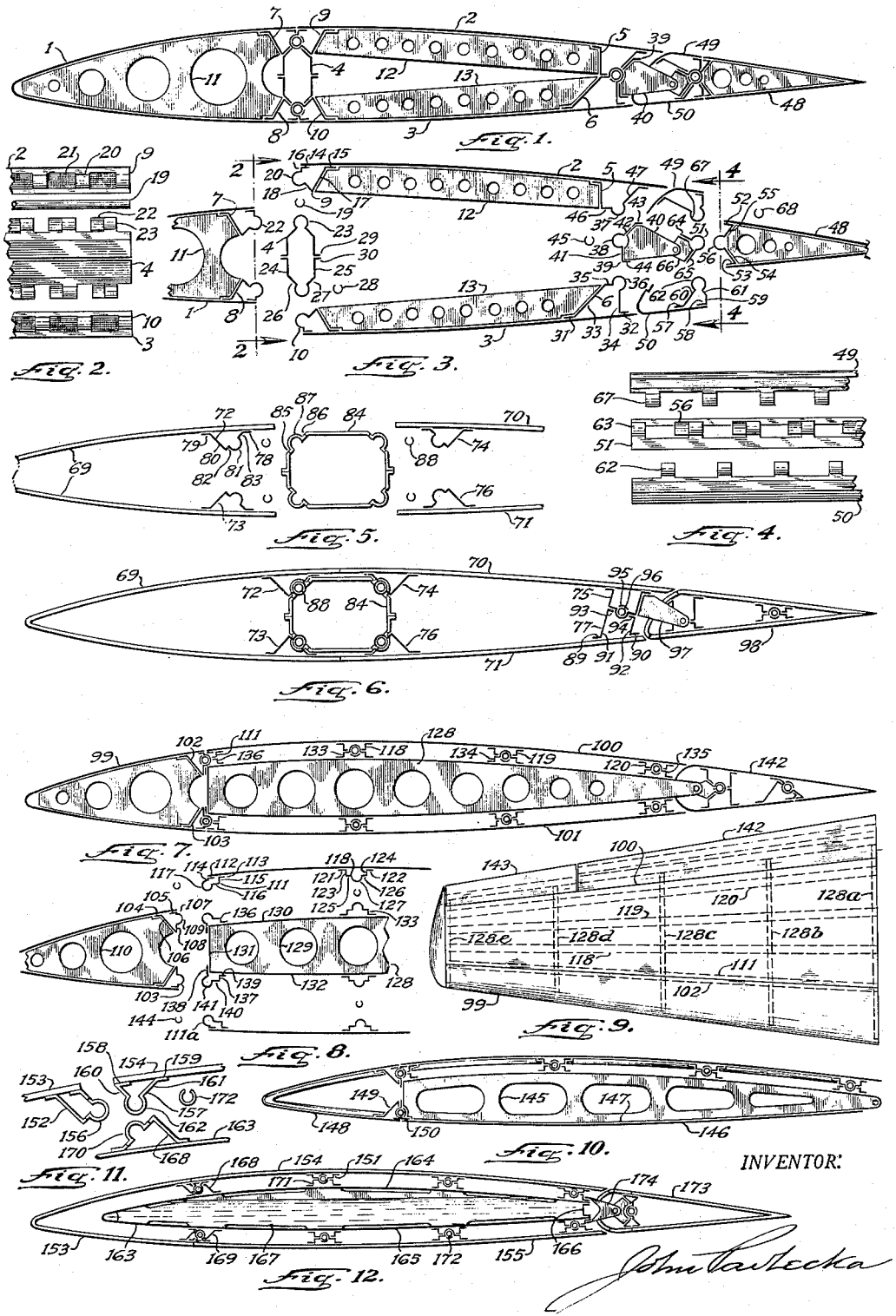
INVENTOR:
John Pavlecka Oct. 3, 1961 J. PAVLECKA 3,002,717
AIRFOIL STRUCTURE
Filed Jan. 12, 1960 3 Sheets-Sheet 2
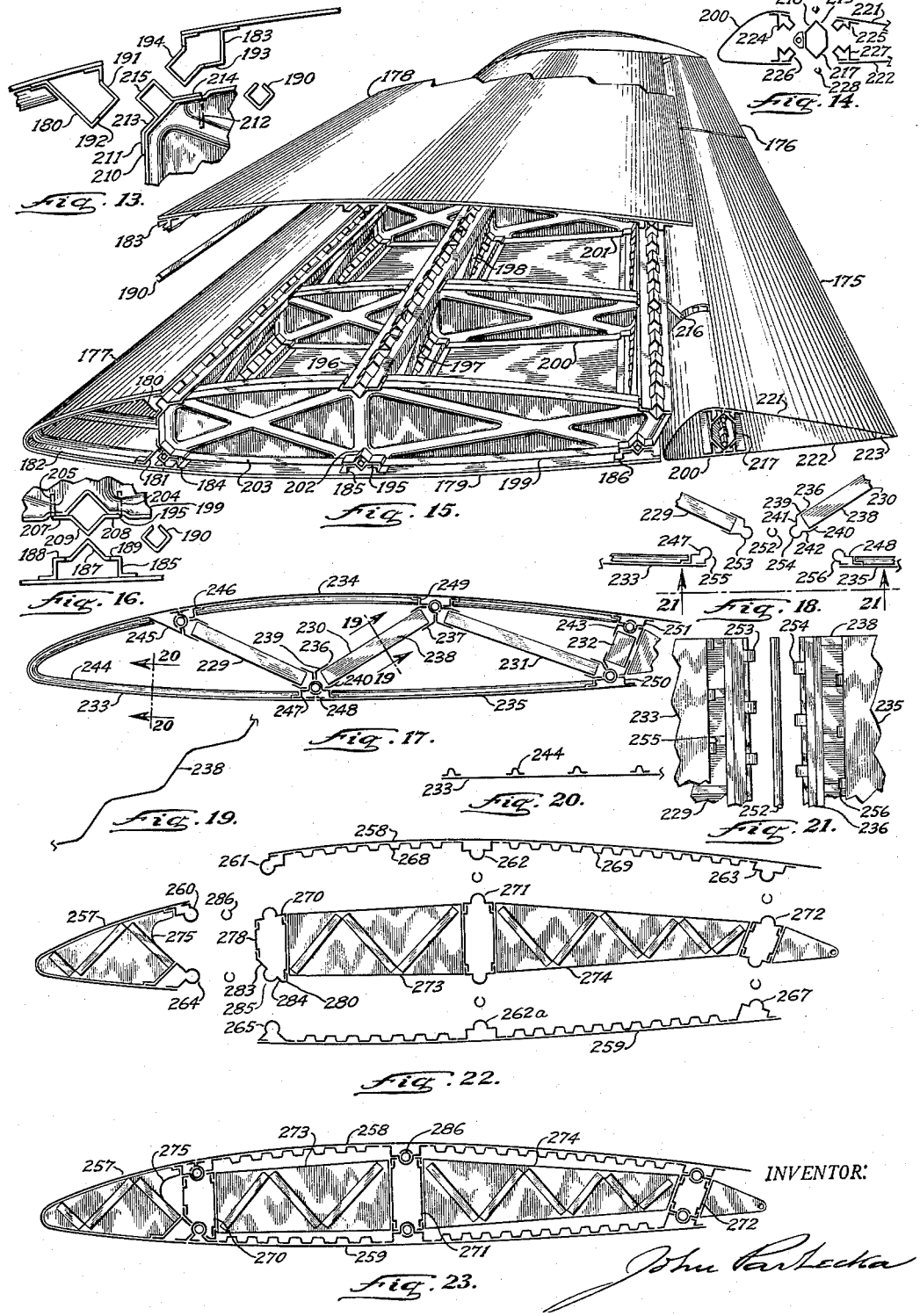
INVENTOR:
John Pavlecka Oct. 3, 1961  J. PAVLECKA  3,002,717
AIRFOIL STRUCTURE Filed Jan. 12, 1960  3 Sheets-Sheet 3

INVENTOR:
John Pavlecka

United States Patent Office 3,002,717
Patented Oct. 3, 1961

3,002,717
AIRFOIL STRUCTURE
John Pavlecka, 8797 Capital, Oak Park 37, Mich.
Filed Jan. 12, 1960, Ser. No. 10,827
25 Claims. (Cl. 244—124)

This invention relates to structures having a shell of an elongated profile such as characterizes all airfoil bodies including airplane and missile wings, control surfaces, stabilizing fins, helicopter rotor blades, etc., and more particularly relates to a novel and useful manner of integrating a sectionalized body shell together with various type of supporting members therein into a rigid unit by means of interlocking keys.

The following of my applications and patents contain subject matter related to the instant one: Airfoil Structure, Patents Nos. 2,959,383 and 2,959,384, and application Serial No. 749,005, allowed December 1, 1960; Panel Structure, applications Nos. 205,787, allowed March 16, 1961, and 265,316, filed January 7, 1952; and Interlocked Panel Structure, application No. 32,509, filed May 26, 1960.

One object of this invention is to devise a structure for inaccessible bodies—of which airfoil bodies are an outstanding example—so that spot welding and adhesive bonding can be employed throughout, and production speeded up and labor cost reduced by fabricating a number of individual components or units with full accessibility and then assembling them into a rigid body from the outside.

A further object is to achieve a smooth and accurate contour in airfoil and other bodies by devising a shell distinguished by a complete absence of the usual countless rivets, overlapping sheet edges, and a multitude of access doors and covers.

Another object resides in devising an airfoil shell interlocked by linear keys from a number of panel units, and providing means for holding the panel units together tightly at their parting lines and in a flush edge-to-edge alinement, and providing means for preventing them from weaving, deflecting, or pivoting around the keys.

Yet another object is an airfoil structure in which the "skin" is provided by a smooth shell composite of one panel unit forming a closed chordal end, and of one dorsal and one ventral panel unit, the panel units being interlocked with each other and with internal supporting members by linear keys through the instrumentality of stringers on the panel units, the stringers being constrained relatively immovably whereby they coact with each other and with the supporting members as unitary stress members for the shell.

A further object resides in a rigid and relatively immovable key-locked union of panel units and supporting members constituting an airfoil structure, the union being effected by means of stringers on the panel units, and its rigidity being obtained by either causing the stringers and the supporting members to abut against each other at confronting faces, or to engage mortised linear keys, or by both of these means in conjunction with each other.

An important object is to devise novel and useful types of supporting members for an airfoil or like shell interlocked of side panel units and one or two closed profile end units, one such type being represented by a framework of spars and bulkheads, another one by chordal bulkheads and spanwise stringers thereon, and yet another one by an internal shell carrying spanwise stringers and serving as a fuel tank.

An airfoil or other structure constructed in conformity with the objectives and principles above set forth comprises a shell and internal supporting members, the shell including a panel unit which forms one closed chordal shell end and side portions collateral thereto, and at least two other panel units alined with the end one at spanwise seams or parting lines on the dorsal and ventral sides; certain shells may include another closed end panel unit which meets the side panel units at spanwise parting lines and forms the other or aft end of the shell. Included within the shell are supporting members which may be of divers types among which certain arrangements of spars and bulkheads are particularly advantageous and will be disclosed with reference to the drawings which form an integral part of this specification.

The shell panel units and the supporting members are individual components or sub-assemblies, and their juncture is effected by linear keys interposed between them from one spanwise end of the shell; each panel unit is provided at and along its edges with stringers, and the side panel units in certain embodiments may be provided with stringers also at intervals intermediate their edges; besides their normal function as auxiliary stress members, the stringers in my new structure perform several additional functions; one of them is that of bearing instrumentalities for engaging slidably the interlocking keys. The supporting members are also provided with corresponding instrumentalities for key engagement, which instrumentalities may be borne either on "caps" as parts of the members, or on stringers analogous to those on the panel units; in the assembled relationship, the supporting members, or the stringers on such members, are in opposite alinement with the panel unit stringers at the shell parting lines and apart from them, and the key-engaging instrumentalities of these components are so coordinated that they latch onto the linear keys in a complemental manner with each other; each two of the adjoining panel units are thus secured together at their parting line, and the supporting members are secured to the panel units at the parting lines and in certain embodiments also apart from them; in some embodiments individual supporting members apart from the parting lines may be omitted and, instead, the stringers on the opposite side panel units are interlocked in opposition directly with each other to provide jointly a spar, i.e., a supporting member, which is another function additional to their normal one.

Two other additional functions which all of the stringers perform reside, first, in serving as carriers of means for rendering them and their panel units relatively immovable in their interlocked relationship, and second, the stringers so immovably interlocked with each other and with the supporting members become virtually an integral part of the members and function jointly with them as unitary stress members of a greatly increased section modulus and load carrying capacity. Two different means for rendering the stringers and the supporting members relatively immobile will be disclosed, and are usable either separately and independently of each other, or in conjunction with each other; one such means is represented by faces carried on the stringers and on the supporting members in confronting positions of each other, at which faces the stringers and the members abut each other by being held tightly together by the interlocking key, or preferably by being drawn against each other by a particular type of such a key; the other means for rendering the interlocked parts relatively immobile resides in employing a mortised key; the stringers and the supporting members become constrained against angular motion by engaging this type of key with lengthwise tenons or tenoned sockets.

It is thus apparent that two types of interlocking keys and engaging means therefor may be employed for locking the stringers and their panel units together with the supporting members and thereby also causing them to become constrained relatively immovably and to coact as a single stress member; one such key type is a rod or tube with a smooth periphery, and the engaging instrumentalities on the stringers and on the members consist of lengthwise hollow portions or archways interrupted by clearance spaces, the archways on the mated parts being staggered congruently lengthwise and being interfitted with each other to obtain jointly a slidable hold at alternate spaces on the key; an improved key of this type is disclosed in my applications Serial Nos. 265,316 and 708,339, now Patent No. 2,959,384; it is confined into place with recoiling forces which it exerts upon the interlocked parts and by their archways draws them into abutment with each other at their confronting faces.

The other type of the key is the aforementioned mortised key; the stringers and the supporting members carry each at least one lengthwise tenon on them, and preferably a segmental socket with two or more of tenons extending lengthwise on it, and is in a slidable engagement with a mortise or mortises in the key periphery complementally to the other stringer and supporting member sockets; an improved key of this type is disclosed in my applications Serial Nos. 23,994, and 32,509, and is distinguished in that the mortises are relatively shallow, and have preferably flat flanks directed so that a dovetail mortise-and-tenon engagement with the sockets around it results.

The above outlined subject matter of my invention will be documented by a number of embodiments, each characterized by a different type of supporting member or members, and embodiments employing both of the two basic key types above referred to will be described with reference to the drawings which form an integral part of this specification.

In the drawings:

FIG. 1 is a profile view of an airplane wing and of a flap or aileron, both of which comprise a shell whose three panel units are interlocked with each other and with two spars in the wing and with one in the flap or aileron.

FIG. 2 is a front view of the fore spar and of the stringers on the dorsal and ventral panel units pertaining to the wing of FIG. 1, taken sectionally through the stringers of the nose panel unit in a plane 2—2 shown in FIG. 3.

FIG. 3 is an exploded view of the components of the wing and of the flap or aileron of FIG. 1.

FIG. 4 is a rear view of the stringers on the dorsal and ventral panel units, and of the spar pertaining to the flap or aileron, taken in a plane 4—4 as indicated in FIG. 3.

FIG. 5 is an end view of the main spar and of the shell panel units of the wing of FIG. 6, shown disassembled.

FIG. 6 is a profile view of a wing structure employing a shell of three panel units key-locked to a main box spar, two of the panel units having stringers on them key-locked to each other to form an aft H-spar.

FIG. 7 is a profile view of an airplane wing in which chordwise bulkheads and spanwise stringers on them form a supporting framework inside a three-panel unit shell, with stringers on the panel units key-locked to those on the bulkheads.

FIG. 8 is a view of the components of the wing of FIG. 7 shown in a disassembled state.

FIG. 9 is a plan view of a wing such as shown in profile in FIG. 7, with a framework of bulkheads and stringers therein.

FIG. 10 is a profile view of a wing in which a framework of bulkheads and stringers is employed similarly as in the wing of FIG. 7, the bulkheads in this embodiment being attached permanently to one of the shell panel units.

FIG. 11 is an enlarged profile view of three associated stringers at the upper shell parting line from the wing of FIG. 12, shown in a disconnected relationship.

FIG. 12 is a profile view of a wing structure in which a shell occupies the airfoil core and with spanwise stringers on it constitutes a stress member in addition to serving also as a fuel tank.

FIG. 13 is an enlarged profile of three associated stringers, shown disconnected, on the front spar and on the panel units at the parting lines in the wing of FIG. 15.

FIG. 14 is an end view of the components of the flap from the wing of FIG. 15, shown disassembled.

FIG. 15 is a perspective view of an airplane wing and its flap and aileron, the dorsal panel being raised from its position to expose an inner framework of spars and bulkheads.

FIG. 16 is an enlarged end view of a bulkhead and a spar cap thereon, and of a companion intermediate type panel unit stringer from the wing of FIG. 15.

FIG. 17 is a profile view of a wing structure comprising a three-panel unit shell and in it spars disposed to form a diagonal truss.

FIG. 18 is an end view of two spars and two shell panel units pertaining to the wing of FIG. 17, shown disconnected.

FIG. 19 is a cross-sectional view of a web from one of the spars in the wing of FIG. 17, taken in a plane 19—19 therein.

FIG. 20 is a cross-section through one of the panel units in the wing of FIG. 17, showing the profile and spacing of stiffeners thereon.

FIG. 21 is a bottom view of the panel units and the spars of FIG. 18, taken in the direction of the arrows 21—21 therein, and showing the stringer and spar cap key-engaging archways.

FIG. 22 are the components of a multispar wing structure shown in a disassembled state.

FIG. 23 is a profile view of a wing assembled from the components shown in FIG. 22, the structure being similar to that of FIG. 15.

Figure 24:
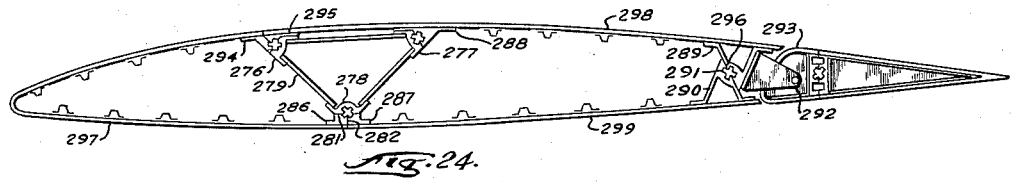
FIG. 24 is a profile view of a wing with a three-panel unit shell and a main box type triangular spar in it, and with an aft spar provided by stringers key-locked to each other, the structure being analogous to that of FIG. 1 but differing from it in that mortised keys are employed instead of the smooth ones of FIG. 1.

The wing structure of FIG. 1 is typical of the other such structures hereinfurther disclosed in that it is composite of three panel units 1, 2 and 3—hereinafter also referred to as "panels"—which form a shell, and of supporting members which are the principal variable as far as their configuration and disposition are concerned, and which in this embodiment are represented by a tubular spar 4 and by a channel member 39.

The panel units include a nose panel 1 which is continuous around the leading profile extremity of the airfoil and terminates with spanwise edges on the dorsal and ventral sides at a distance from the extremity; a dorsal panel 2 and a ventral panel 3 are complements to the nose panel 1 from their parting line therewith rearwardly, and terminate with spanwise edges at the trailing profile extremity of the airfoil. All three of the panels have extending on their inner face along their edges stringers 7—8, 9—5, and 10—6, respectively, and chordally between these stringers and abutting their walls are provided with webs 11 in the nose panel unit, and with ribs 12 and 13 on the side panel units, for transfer of air forces from the panels into the stringers.

The stringers, as auxiliary stress members, are formed to possess a large section modulus, such as by being tubular; the nose panel stringers 7—8 and the dorsal and ventral panel edge stringers 9 and 10 are all substantially alike, their profile including attaching flanges 14—15, walls 16—17, a shoulder 18 at a distance from the panel, and carried by and between this shoulder and the wall 16 is a means for engaging a linear key jointly with the other stringers; in this and in the next seven embodiments this engaging means consists of a series of lengthwise protruding archways 20 which overhang partially the panel edge, and which are interrupted by clearance spaces 21 whose length and width are somewhat larger than those of the archways; the archways 20 and 22 on each two juxtaposed stringers along a panel parting line are shifted lengthwise so that when the panels are brought into edge-to-edge alinement with each other, their stringers 7 and 9 come into a confronting position of their walls or faces 16, and their archways 20 and 22 interfit into a near axial alinement with one another through the clearance spaces between them; in this relationship, each pair of interfitted archways 20—22 leaves vacant next to it a portion of the clearance space 21, which portion is long enough to accommodate an archway 23 pertaining to the spar 4, and is occupied by it at assembly; a smooth linear key 19 is inserted slidably into the interfitted archways to interlock them and their stringers, panels and spar with each other.

The spar 4 consists of spaced side walls 24—25, two convergently slanted shoulders 26—27 at each profile extremity, and between them a series of archways 23 separated by clearance spaces, which are duplicates of those on the panel stringers, such as 20 and 21, and are congruently coordinated therewith lengthwise. The inclination of the spar shoulders 26—27 conforms to that of the shoulder 18 on the stringers 7 and 9, and 8 and 10, so that they confront one another as the archways 23 fall in line with the stringer archways 20—22 and are interlocked by the respective keys 19 and 28; this action urges both stringers and the spar into abutment with one another shoulder-against-shoulder, and urges the stringers into abutment with each other at their walls 16; in this abutted condition the stringers and the spar block each other against any relative movement and acquire cohesion against forces tending to separate them; furthermore, in addition to being constrained inflexibly at their parting lines through the instrumentality of the interlocked stringers and spar, the shell panels are coerced into a tight edge-to-edge contact with one another so that they present a smooth and flush surface. Another useful result of the stringers and spar so abutted in the presence of the interlocking keys is that because of their relative immobility all of these parts become virtually a single member and coact in stress resisting with their combined increased cross-sectional area and greatly augmented section modulus.

The above disclosed abutted relationship of the interlocked stringers and the spar can be made even more effective for the results which it affords by employing a particular type of the key which is disclosed in my application Serial No. 265,316 and in my Patent No. 2,959,384; this key, as also shown at 19 and 28 in FIG. 3 as well as in all the other embodiments in the drawings where the keys are shown in their free condition, is slit lengthwise so that it has an open profile which is normally oversize; when inserted into the stringer and spar archways, the key size is reduced resiliently and recoiling forces are thereby induced in it; these forces are exerted upon the stringer and spar archways and cause them to draw the stringers and the spar into a forcible abutment at their respective walls and shoulders, thus introducing pre-loading forces into their interlocked union against its disruption.

The stringers 5 and 6 along the panel trailing edges are both of a similar profile which includes attaching flanges 31—32, lateral walls 33—34, a shoulder 35 on the inward wall, and protruding archways 36 separated lengthwise by clearance spaces; the archways 36 on the stringer 6 are staggered lengthwise to the archways 37 on the stringer 5 so that when the stringers are in a shoulder 35 to shoulder 46 position, their archways interfit complementarily next to each other and leave unoccupied a portion of the clearance space separating the archways in each series; the unoccupied spaces are for accommodation of archways 38 on the spar 39; the interfitted stringer and spar archways are interlocked by a linear key 45.

The spar 39 mounts along its length hinge brackets 40 to which is attached pivotally either an aileron, a flap, or an air brake, and the function of the spar is to transfer the air forces thereon into the stringers 5—6 as well as to reinforce these stringers in their function as a wing supporting member; to this end, the spar 39 has two shoulders 41 and 42 astride the archways 38, which shoulders confront the respective stringer walls 34 and 47, and are drawn into abutment with them, as are the stringer shoulders 35—46 with each other, in the presence and by the action of the oversize key 45; the stringers and the spar so abutted relatively immovably coact as a unitary stress member.

A construction similar to that of the wing above disclosed distinguishes the flap or aileron hinged to the brackets 40, and includes a panel 48 which forms the closed trailing end of the shell, a dorsal panel 49 and a ventral panel 50, and a hinge spar 51; the panels 49—50 form jointly the nose of the shell and meet the closed end panel 48 at spanwise parting lines. All three of the panels are provided with stringers, of which stringer 52 is attached at 53 to the opposite sides of the panel 48 and on webs 54—55 supports a series of archways 56 separated by clearance spaces; the dorsal and ventral panel stringers are substantially alike, each consisting of flanges 57—58, lateral walls 59—60, a slanted shoulder 61, and a series of archways 62 with intervening clearance spaces.

A fourth component is included in the cluster of the panel stringers as a V-shaped spar 51 which corresponds to the spar 39 in the wing in that it mounts hinge brackets 66 and transfers all air loads on the flap or aileron into them; the spar 51 carries archways 63 (FIG. 4) and astride them webs 64—65 for the two-fold purpose of securing the brackets 66 to their inner faces, and to provide abutment faces with their outer side against the stringer walls 60; this obtains when the spar and stringer archway series 51, 56, 62 and 67, spaced as shown in FIG. 4, interfit congruently with each other and a key 68 enters into them and by distending forces causes the spar and the stringers to abut against each other and become a unitary stress member in a tightly closed shell.

The wing structure of FIG. 6 and its components as shown in FIG. 5 differ from those of FIGS. 1 and 3 in that the shell is of the self-supporting or monocoque type, the panel units 69—70—71 forming it being of thick stock and meeting edge-to-edge at two parting lines on the opposite shell sides; extending along these parting lines at a distance from them are stringers 72, 73, 74 and 76 of an identical profile; each has flanges 78—79, lateral walls 80—83 bearing a shoulder 82 and a series of archways 81 separated by lengthwise clearance spaces; the wall 83 functions, in the assembly, as a twin abutment shoulder to the shoulder 82.

The spar 84 is a tubular member with shoulders 85—86 on each corner and between them a series of archways 87 with intervening clearance spaces; when interfitted with the stringer archways, the stringer shoulders 82—83 abut the spar shoulders 85—86, and are locked in that relationship by linear keys 88 as well as drawn by their resiliently confined oversize shape forcibly against each other for relative immobility.

In the trailing portion of the wing opposite stringers 75—77 pertaining to the side panel units 70 and 71 jointly provide an H-spar; each one has flanges 89—90, walls 91—92 and shoulders 93—94 on them, and between the shoulders a series of archways 95 separated by lengthwise clearance spaces; the stringers are drawn into abutment with each other at their shoulders by a linear key 96 in engagement with the interfitted archways; brackets such as 97 carried on one of the stringers support pivotally an aileron or a flap 98.

The wing structure of FIG. 7 has its three-panel unit shell constituted of units 99—100—101 meeting at two parting lines; the nose panel 99 has stringers 102—103 along its edges, both characterized by flanges 104—105, a wall 106 which jointly with the flange 105 supports shoulders 107—108 at the parting line plane, and between them archways 109 separated by open spaces; webs such as 110 abut the stringer wall 106 and thereby support the nose panel 99.

The side panel units 100 and 101 differ only in shape, both having a stringer 111 on them at and along the parting line of a profile defined by attaching flanges 112—113, walls 114—115 on them, the former wall functioning as an abutment shoulder at the parting line plane; between it and a shoulder 116 on the wall 115 runs a series of archways 117 with intervening lengthwise clearances, the archways overlapping from one half the parting line plane.

Extending spanwise at intervals apart from the edge stringer 111 on each of the panels 100 and 101 is a number of stringers 118 to 120, all alike, with attaching flanges 121—122, walls 123—124, shoulders 125—126 on the walls, and between the shoulders archways 127 separated by clearance spaces.

Disposed chordwise in the shell is a number of bulkheads such as 128 which have a web 129, and flanges 130—131—132 along its borders, and on these flanges carry stringers in opposed alinement with the stringers on each of the shell panels; of these bulkhead stringers, 133 to 135 and their counterparts on the ventral side are all alike and are identical with the panel stringers 118—120; two of the bulkhead stringers, 136 and 137, both alike, have a profile consisting of flanges 138—139 attached to the respective bulkhead flanges 131—130 and 131—132 over their corner, a wall on the flange 139 and a shoulder 140 supported by it, and a series of archways 141 between this shoulder and the flange 138.

As shown in FIG. 9, the bulkheads 128a to 129e together with the stringers secured to their upper and lower flanges form a framework of supporting members for the shell; in this framework, each two superimposed stringers constitute the profile extremities of a spar with the bulkhead webs providing lattices therebetween. At their trailing end the bulkheads project from the shell and support pivotally a flap 142 and an aileron 143. The opposed stringers on the panels and on the bulkheads interfit with their archways into confronting positions of their shoulders and when keys 144 are telescoped into them they are urged into abutment with each other against relative motion and separation under strain; the interlocked stringers and the keys in them function as spanwise stress members and as the principal supporting members for the wing.

A modification of the structure of FIG. 7 as shown in FIG. 10, and resides in that the bulkheads 145, instead of being key-locked to the ventral panel 146 are secured to it permanently by a flange 147; stringers 149 and 150 on respective panels 148 and 146 join them together at the ventral parting line, the stringers being in abutment with each other at the parting line plane. This embodiment possesses the same advantages of accessible fabrication of its components as the preceding embodiments and is simpler in that stringers and interlocking keys are dispensed with on the tension side of the wing where the shell alone can be made to resist such stresses.

The effective utilization of material that obtains in the framework of the foregoing embodiments may be extended by the adoption of an interior shell which envelops the bulkheads, such as shown in the wing of FIG. 12; furthermore, such a shell may serve the additional purpose of being used as a fuel tank.

The airfoil shell in this wing is made up of panel units 153—154—155 with stringers at and along their parting lines and at intervals apart from them; the latter stringers, such as 151, are identical with the stringers 118—120 of FIG. 7; the parting line stringers are shown on an enlarged scale in FIG. 11; stringer 152 on the nose panel 153 has a profile analogous to that of the stringer 7 or 8 of FIG. 3 with archways 156 on it; the companion stringer 157 on the panel 154 includes flanges 158—159, walls 160—161 and archways 162 on them; the stringers along the ventral parting line are duplicates of those on the dorsal side.

The inner shell 163 is a sealed body consisting of two sides 164—165 parallel to the airfoil shell sides, and a channel 166 providing a closure along their trailing end. For its function as a stress member the shell 163 is reinforced by bulkheads 167 within its walls, which bulkheads function also as baffles against surging of the fuel. Extending on the shell 163 in opposition to the airfoil shell stringers 152—157 and 151 is a number of stringers of which 168, and its counterpart 169 on the lower side, correspond in profile and archways 170 to the panel stringers 72 to 74 and 76 of FIG. 5; the remaining stringers, such as 171, are all alike and are identical with their companion panel stringers 151. The juxtaposed stringers at the panel parting lines, and they as well as the stringers on both shells in opposition to each other apart from the parting lines are coordinated so that their archways interfit congruently and the stringers abut each other shoulder-against-shoulder; when linear keys 172 are entered into the stringers and subject them to tension, either because of the resiliency of the stringers or of the keys, or both, all of the components of the structure become locked together and constrained as a unitary body. An aileron or flap 173 is supported by the inner shell on brackets 174.

The wing structure of FIG. 15 is a modification of the one of FIG. 7; its nose panel 177 has stringers 180 and 181 on its stiffeners 182 based on them; the side panels 178 and 179 are provided with duplicate stringers of two types; stringers 183 and 184 of one type extend in juxtaposition to the nose panel stringers 180 and 181; as shown in FIG. 13, the juxtaposed pairs, such as 180—183, differ from the corresponding stringers of FIG. 7 mainly in the profile of their archways shaped to engage square keys 190; the angular archways 191 of the stringer 180 are perforated lengthwise by clearance spaces between a wall at the parting line plane and a shoulder 192 on the inward wall; similarly, in the companion stringer 183 two lateral walls carry a shoulder 193 and rectangular archways 194 alternating with clearance spaces; The other type of the panel stringers is represented by 185 and 186 apart from the parting lines, and is analogous to stringers 118—120 of FIG. 7 except in that they carry, as shown in FIG. 16, between their shoulders 188—189 flat-sided archways 187 which converge to an apex to conform to the square keys 190 in a biased position.

The supporting members in the wing of FIG. 15 form a framework of spars and bulkheads, the spars consisting each of two superimposed stringers or caps 195—196 connected by diagonal truss members 197 and 198; the bulkheads 199, 200 and 201 function as vertical truss members in each spar; they have double webs and recesses 202 in their flanges 203 for accommodation of the archways of the panel stringers and of the keys therein; the caps on the spars apart from the parting lines have walls 204—205, shoulders 207—208, and archways 209 interrupted by lengthwise clearances. At the panel parting lines, the spar caps, as shown in FIG. 13 by cap 210, have walls 211—212, shoulders 213—214 confronting the shoulders 192 and 193 on the respective panel stringers, and rectangular archways 215 serrated lengthwise by clearances.

All of the foregoing panel stringers and spar caps are coordinated to interfit with each other through the clearances therein and to abut shoulder-against-shoulder; they are urged into such abutment by the keys 190 of an open and normally oversize profile for exerting recoiling forces upon the stringer archways and thereby causing them to react against each other at their shoulders.

Certain of the bulkheads in the wing of FIG. 15 end with brackets 216 to which is hinged a flap 175 and an aileron 176, the construction of both relying upon a single spar 217 as the supporting member; as shown in FIG. 14, the spar has pointed profile extremities formed by walls 218—219 whose apex portions are serrated lengthwise to give rise to an intermediate depth to give rise to a series of archways and leave abutment shoulders along them. The shell is divided into a nose panel 200 and side panels 221 and 222, the latter being joined at their trailing end through a strip 223. Along their parting lines, the panels are provided with juxtaposed stringers 224—225 and 226—227 which are basically like the stringers 7—9 and 8—10 of FIG. 3 except in that their archways are rectangular instead of round; when interlocked by oversize and resiliently contracted keys 228, the stringers abut with their shoulders the continuous portions of the spar walls 218—219, and with their parting plane walls abut each other, while their archways and those of the spar are drawing them against each other due to forces induced by the keys.

The airfoil structure of FIG. 17 employs spars 229 to 232 which are inclined into proximate positions of their profile ends to form a diagonal truss within a three-panel shell 233—234—235; each spar includes caps 236 and 237 and a web 238 which alternates between the cap walls 239—240 (FIG. 18) in the manner shown in FIG. 19; the cap walls carry slanted shoulders 241—242 on them, except for coplanar ones on the cap 243 of the rearmost spar 232, and carry archways 254.

The shell panels are made rigid by chordwise stiffeners 244 which extend between spanwise stringers on their inner face; these stringers are of three types represented by 245, 246 to 248, and 249 to 251, which are of profiles identical with the stringers 102, 111, and 118, respectively, of FIG. 7.

There are five spar and panel unions in this structure, interlocked by keys 252, the number of the components locked together at these unions varying from two to four, which calls for different arrangements in the spacing of the interfitted spars and stringers; one such arrangement is shown in FIG. 21 and represents spars 229 and 230 and panels 233 and 235 at the ventral parting line; the archways 253, 254, 255 and 256 on the respective spars and stringers are all of equal length and the clearance spaces between them are a little over three times as long as the archways; the archways are staggered lengthwise to obtain a hold on the key 252 one next to each other as the spars and panel units complement each other around the key by abutment against each other at four pairs of confronting shoulders.

FIGS. 22 and 23 illustrate a wing structure and its components similar to those of FIG. 15; three panel units 257—258—259 constitute the shell and have stringers 260 and 261 on them in juxtaposition at one parting line, which stringers are identical with the stringer 111 of FIG. 8 with abutment shoulders 114 and 116 on it; stringers 264 and 265 at the other parting line are identical with the stringers 152 and 157, respectively, of FIG. 11 with shoulders 160 and 161 on them, and stringers 262 and 263 apart from the parting lines are the same as stringer 118 of FIG. 8, with shoulders 125 and 126 on it, while stringer 267 has its antecedent in the stringer 91 with shoulders 93 and 94 of FIG. 6. Corrugated sheets 268 and 269 reaching from stringer to stringer on the underside of the panels function as stiffeners for them.

Support for the shell is provided by a framework of spars 270, 271 and 272 and bulkheads, the latter consisting of webs 273—274 connecting each two of the spars; a web 275 in the nose panel unit abuts the stringers therein. The spars carry caps such as 280 on their profile extremities, with shoulders 283—284 and archways 285 on them. When the archways of the stringers and of the spars are interfitted with each other, the lateral walls on the stringers in juxtaposition as well as the shoulders on these stringers and on those apart from them in opposition to the spars are brought into abutment with each other through the instrumentality of keys 286; by virtue of being inserted with recoiling forces in them, the keys cause the stringers and the spars to cohere with preloading forces and block each other relatively immovably in the same manner and for the same results as in the foregoing embodiments.

In the next four disclosed embodiments the keys are also instrumental in interlocking the airfoil components relatively immovably by virtue of their profile, which profile is mortised lengthwise and the stringers and spars engage it by means of segmental sockets which bear tenons interfitting with the key mortises and thereby immobilizing themselves in relation to the keys as well as to each other; additionally, the same opposite shoulders or faces on the components may be employed and caused to abut against each other as in the case of the smooth keys, one reason favoring them being that due to the slidable engagement of the mortised keys with the tenoned sockets the degree of relative immobility with the keys may vary because of manufacturing tolerances or because of a small key size; if the stringers and the spars are made to abut at confronting faces or shoulders, they provide a bearing one on each other not only for blocking and constraining themselves immovably additionally to the key function in that respect, but for direct contact and increased coaction as a unitary stress member; improved keys of the mortised type which make these results possible are disclosed in my applications Serial Nos. 23,994 and 32,509.

In the wing structure of FIG. 24 panel units 297—298—299 form a shell supported by a main spar 279; this spar has a triangular shape with webs in its sides and caps 276, 277 and 278 at its apices; each of the caps has two shoulders 281 on it and between them a segmental socket with marginal half-tenons under the shoulders and a number of full tenons intermediate of them. The panel units include juxtaposed stringers 294—295 and 286—287 on them at their respective parting lines, an intermediate stringer 288 on the side panel 298 apart from the dorsal parting line, and opposed stringers 289—290 on the side panels 298 and 299 at their aft edges; each of the stringers has a profile characterized by a segmental tenoned socket and two abutment faces therealong; on the opposed stringers 289—290 these faces are on coplanar shoulders 296, and such shoulders are also present on the intermediate type stringer 288; the juxtaposed stringers 286—287 and 294—295 have each a frontal shoulder 281 and a lateral wall 282 for abutment of the stringers against each other at the panel unit parting lines so that they jointly form an equivalent of a 180-degree segmental tenoned socket with shoulders therealong. In the assembly, the panel unit stringers are in alinement of their sockets with those in the spar, and are in abutment of their shoulders 281 with those on the spar caps, as are the aft opposed stringers 289—290 with each other; into the alined sockets are inserted mortised keys 291 around which the stringers and the spar caps become immobile both because of their mortise-and-tenon engagement with the keys and their abutment at faces with each other. The opposed stringers 289—290 function jointly as a rear spar in the manner of the stringers 5—6 of FIG. 1, and on brackets 292 support an aileron or flap 293.

Figure 25:
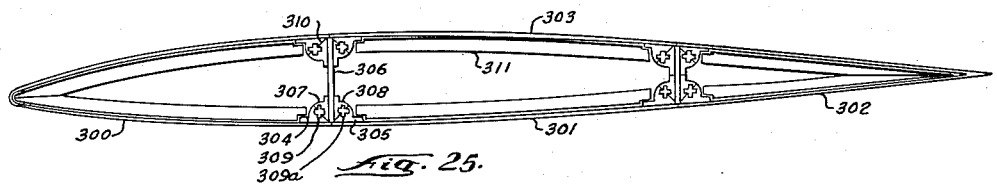
FIG. 25 is a profile view of an airfoil structure such as a wing, rotor blade, or stabilizer, in which four panel units and two spars are interlocked with each other relatively immovably by mortised keys two of which are used to join the panel units at each parting line with the spar thereat.

The airfoil structure of FIG. 25 has a closed shell keylocked together of four panel units 300 to 303 parted at two vertical planes, and spars are located and keylocked to the panel units in both planes; each two meeting panel units are provided with stringers such as 304—305 which have faces 310 on them slanted convergently towards the parting line, and each face has a segmental tenoned socket in it; inbetween each two such stringers fits a profile extremity of a spar; each spar consists of a web 306 and two caps 307—308 on its profile ends, the caps having slanted faces and in each a segmental tenoned socket; the spar caps fit face-to-face inbetween the panel stringers, and their matching segmental sockets engage mortised keys 309 and 309a, thereby not only locking the spars and the panel units together but causing them to abut at the confronting faces thereon, and causing the shell panels to be held edge-to-edge at their parting lines.

Figure 26:
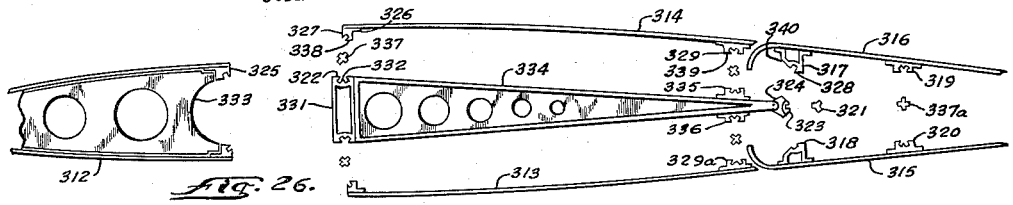
FIG. 26 is an exploded view of the components pertaining to the wing of FIG. 27.
Figure 27:
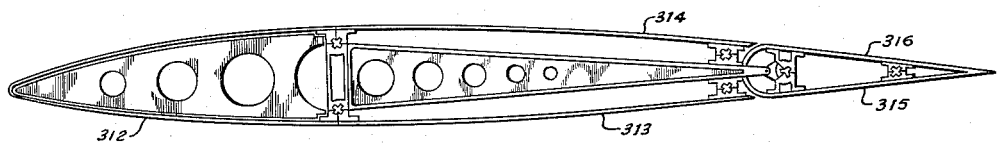
FIG. 27 represents an end view of a wing wherein a framework consisting of a main spar, outriggers projecting from it through the aft profile end and mounting pivotally an aileron or flap, and stringers on the outriggers functioning as an auxiliary spar, are key-locked to stringers on three shell panel units.

The type of the structure of FIG. 27, the components of which are shown in FIG. 26, is applicable equally well to such combinations as wing and aileron, fin and rudder, or stabilizer and elevator; its main body includes panel units 312—313—314 and juxtaposed stringers 325—326 on them at each parting line, and intermediate type of stringers 329 along their trailing edges; each of the juxtaposed stringers has a lateral abutment face 327 and a frontal shoulder 338 on it, and the intermediate stringers have coplanar shoulders 339; all of the stringers are formed with segmental tenoned sockets.

The supporting members consist of bulkheads 333 in the nose panel unit based upon the stringers therein, and a framework of a spar 331, outriggers 334, and stringers 335 and 336 on the outriggers and therewith functioning as an auxiliary spar; the outriggers are secured to the spar 331 and from it project aft and terminate beyond the stringers 335 and 336 as brackets for mounting pivotally an aileron or flap; the spar 331 carries in its profile extremities segmental tenoned sockets 332 and shoulders 322 alongside them, identical sockets being carried in the stringers 329 on both panel units between shoulders 339 as well as in the stringers 335 and 336 in opposition to them.

In the assembled structure, the juxtaposed stringers 325—326 at both panel parting lines confront each other with walls 327, and with shoulders 308 confront jointly the spar shoulders 322 and are abutted against them in the presence of mortised keys 337 in the stringer and spar sockets; the same abutted relationship obtains in the aft end between the panel stringers 329 and 329a and the outrigger stringers 335 and 336 when keys such as 337 are in engagement with their sockets; because these stringers are interlocked relatively immovably and because of their bearing against each other at their shoulders, they function as a unitary supporting member for the shell and for the aileron or flap hinged to the outriggers.

The construction of this aileron or flap also embodies the principles of relatively immovably key-locked stringers, in this case applied to a two-panel shell; in it, stringers 317—318 and 319—320 pertaining to panel units 315 and 316 are interlocked by mortised keys 321 and 337a, respectively, and in their abutted condition at shoulders 328 provide supporting members for the shell; the segmental sockets and shoulders 340 therealong on the stringers 317—318 jointly encompass 270 degrees of the key 321, the remaining sector being occupied by a segmental socket and shoulders therealong of a longeron 323; this longeron has brackets 324 at lengthwise intervals on it for attaching the assembled shell pivotally to the outriggers 334 in the main shell. This construction and that of the flap or aileron 142 shown in FIG. 7 are both distinguished by analogous components and interlocked and abutted relationships except that the mortised keys in the former case engage the components by their angular portions while the smooth keys in the latter case engage them by lengthwise portions.

Figure 28:
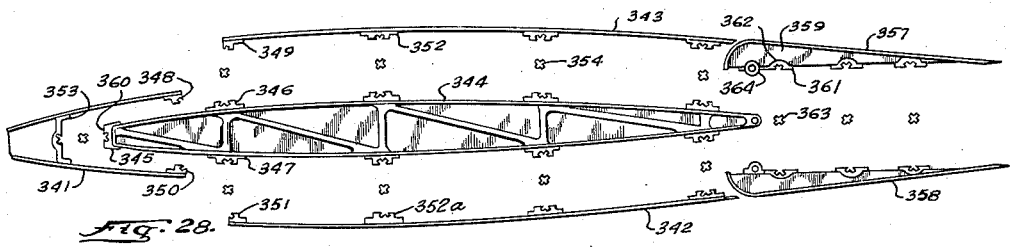
FIG. 28 is an exploded view of the components which constitute the airfoil and control surface structures of FIG. 29.
Figure 29:
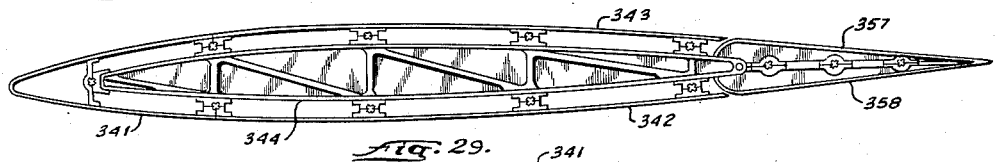
FIG. 29 shows a structure applicable to wings, fins, and stabilizers, which comprises a number of bulkheads within a three-panel unit shell, the bulkheads and the panel units being held together rigidly by spanwise stringers on them in a mortise-and-tenon engagement with linear keys.
Figure 30:
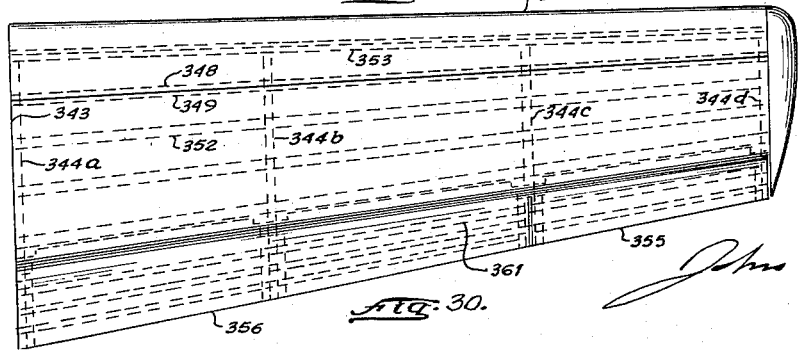
FIG. 30 is a plan view of a wing employing the type of the structure as shown in FIG. 29.

FIGS. 28 to 30 represent an embodiment analogous, except for the aileron and flap construction, to that of FIG. 7; the shell consists of panel units 341—342—343 which are supported by a framework of bulkheads 344 and spanwise stringers on them. The panel units are provided with juxtaposed stringers 348—349 and 350—351 at their two parting lines which are duplicates of the stringers in the preceding structure of FIG. 22 in the same location; in in its interior, the nose panel 341 includes a stringer 353 which has its attaching flanges on the opposite panel sides and a web connecting them and bearing a segmental tenoned socket, the web providing abutment faces along the socket. The side panels 342 and 343 have each a number of intermediate type stringers 352 on them at intervals apart from the parting lines; these stringers have each a segmental socket and frontal shoulders like those on the stringer 329 of FIG. 26.

The distinguishing feature of the bulkheads over those of FIG. 7 is that they project forwardly of the panel parting lines into the nose panel to support it; for this purpose they carry a stringer 345 with a segmental tenoned socket in it and shoulders 360 facing forwardly along the socket; at intervals apart from this fore stringer the bulkheads carry stringers 346 on their dorsal side and 347 on their ventral side, which are analogous in the matter of the socket and shoulders therealong to the panel stringers 352 and extend in opposition to them.

In the assembled structure, the fore panel and bulkhead stringers 353—345 abut each other, as do the side panel and bulkhead stringers 352—346 and 352a—347, and the panel juxtaposed stringers 348—349 and 350—351 abut each other and jointly abut one of each of the respective bulkhead stringers 346 and 347 in the presence of mortised keys 354 in their sockets.

The auxiliary shell pivoted to the main one in the structure of FIG. 29, whether it serves as an aileron 355 or flap 356 as shown in FIG. 30, embodies the same principles of stringers key-locked and abutted relatively immovably as those in the main shell, in this case applied to a two-panel shell; the panel units 357 and 358 are substantially alike, each constituting one half of the shell divided in a horizontal plane; each unit has chordal ribs 359 on it, and a number of stringers 362 extending spanwise on the ribs; the stringer profile includes two shoulders 361 and a segmental tenoned socket between them; the stringers on both panel units confront each other with their shoulders as keys 363 are telescoped into their alined sockets and are made to abut against each other by the engagement of the keys with those sockets; hinges 364 are provided on the ribs 359 in each panel unit for mounting the complete shell on the ends of the wing bulkheads 344.

I claim:

1. In a structure, a number of panel units forming a shell of an elongated profile with at least one closed profile extremity, a supporting member in said shell in a spaced relationship to said panel units, a stringer extending on each of said panel units in opposition to said supporting member, a linear key interposed between said supporting member and each stringer, said supporting member and each stringer having lengthwise portions in a slidable engagement with said key, and means on said supporting member and on each stringer for rendering them relatively immobile by said engagement thereof with said key for coaction of the panel unit stringers with each other and with said supporting member as a unitary stress member.

2. In a structure, components and their relationships as set forth in claim 1, said means for rendering said supporting member and stringers relatively immobile including confronting faces on said supporting member and on each stringer along said key, said supporting member and said stringers being held in abutment at said faces thereof by said key-engagement portions thereof in engagement with said key.

3. In a structure, components and their relationships as set forth in claim 1, said means for rendering said supporting member and stringers relatively immobile including, lengthwise mortises in the periphery of said key, and at least one lengthwise tenon on said supporting member and each stringer, said supporting member and said stringers being in a slidable and otherwise substantially immobile mortise-and-tenon engagement with said key.

4. In a structure, components and their relationships as set forth in claim 3, said supporting member and each panel unit stringer having confronting faces thereon along said key, said supporting member and said stringers being held in abutment at said confronting faces thereof by said mortise-and-tenon engagement thereof with said key.

5. In a shell structure, one panel unit forming a closed profile extremity of the shell, two panel units meeting said closed extremity panel unit at two lengthwise parting lines on the shell opposite sides, a supporting member interjacent said parting lines, linear keys interposed between said supporting member and said panel units at and along each of said parting lines, said supporting member and said panel units having lengthwise portions in a slidable engagement with said keys, means on each two of said panel units and on said supporting member for constraining said panel units immovably relatively to each other and to said supporting member while being in engagement with said keys.

6. In a structure, components and their relationships as set forth in claim 5, stringers extending on said panel units as integral parts thereof and bearing said key-engagement portions thereof, said constraining means including confronting faces on said stringers laterally between each two of said meeting panel units and frontally between said stringers and said supporting member.

7. In a shell structure, components and their relationships as set forth in claim 6, chordal ribs at lengthwise intervals on said closed extremity panel unit, and chordal ribs at lengthwise intervals on said side panel units, said ribs abutting the stringers on the respective panel units and being secured thereto for transferring forces from said panel units into said relatively immobile stringers and supporting member.

8. In a structure, two panel units meeting with each other at a parting line, a supporting member extending at and along said parting line, two linear keys paralleling said supporting member in a spaced relationship to said panel units, stringers extending one on each of said panel units along said parting line and having lengthwise portions in a slidable engagement each with one of said keys, said supporting member having lengthwise portions in a slidable engagement with both of said keys, and confronting faces on said stringers and on said supporting member along said key-engagement portions thereof, said faces being slanted in the direction toward said parting line, said stringers and said supporting member being held in abutment with each other at said confronting faces by said key-engagement portions thereof in engagement with said keys and said panel units being held edge-to-edge at said parting line by said abutted stringer and supporting member relationship at said slanted faces.

9. In a shell structure, a panel unit forming one closed profile extremity of the shell, two panel units meeting said closed extremity panel unit at two lengthwise parting lines on the shell opposite sides, a supporting member in said shell, means attaching said supporting member to said side panel units, linear keys interposed one between said supporting member and said shell at and along each parting line, stringers extending on said closed extremity panel unit along said parting lines and having lengthwise portions in a slidable engagement with said keys, said supporting member having lengthwise portions in a slidable engagement with said keys, lateral confronting faces on said stringers and on said side panel units along said keys, and frontal confronting faces on said stringers and on said supporting member along said keys, said lateral and frontal confronting faces being held in abutment with each other by said stringer and supporting member key-engagement portions in engagement with said keys.

10. In an airfoil structure, one panel unit forming a closed profile extremity of a shell, two panel units meeting said closed extremity panel unit at spanwise parting lines on the shell opposite sides, supporting members in said shell, means attaching a first one of said side panel units to said supporting members, one of said supporting members extending along the parting line of the other one of said side panel units with said closed extremity panel unit, another supporting member extending along said other side panel unit apart from said parting line, a linear key interposed between said first side panel unit and said closed extremity panel unit at the parting line thereof, a linear key interposed between said panel units meeting at the other parting line and said supporting member therealong, a linear key interposed between said other side panel unit and said supporting member therealong, said panel units and each supporting member having lengthwise portions in a slidable engagement with the respective key therebetween, and means on said panel units and on each supporting member for constraining said panel units immovably relatively to each other at said parting lines and to each supporting member therealong and apart therefrom while being in engagement with the keys.

11. In an airfoil structure, components and their relationships as set forth in claim 10, said means attaching said first side panel unit to said supporting members including, one of said supporting members extending along the parting line of said first side panel unit with said closed extremity panel unit and said key thereat, another supporting member extending along said first side panel unit apart from said parting line, a key interposed between said side panel unit and said supporting member, said supporting member along said parting line having lengthwise portions in a slidable engagement with said key thereat jointly with said panel units, said first side panel unit and said supporting member therealong having lengthwise portions in a slidable engagement with said key therebetween, and means on said panel units and on each supporting member for constraining said panel units at said parting line and said first side panel unit relatively immovably to each supporting member therealong while being in engagement with the keys.

12. In an airfoil structure, one panel unit forming a closed profile extremity of a shell, two panel units meeting said closed extremity panel unit at spanwise parting lines on the shell opposite sides, a number of spars in said shell, one spar being interjacent said parting lines and the remainder of said number being interjacent said side panel units, said spars bearing caps along said panel units, stringers extending on said panel units at and along said parting lines in juxtaposition to each other and in opposition to said spar and caps thereat, stringers extending on said side panel units in opposition to the remainder of said number of spars and caps thereon apart from said parting lines, linear keys interposed between said stringers and spar caps in oppostion, said stringers and said spar caps having lengthwise portions in a slidable engagement with said keys, and means on said stringers and on said spar caps for rendering them and said panel units immobile relatively to each other and to said spars while being in engagement with said keys.

13. In an airfoil structure, a number of panel units forming a shell and meeting with each other at spanwise parting lines on the shell opposite sides, a spar extending in said shell interjacent said parting lines, said spar having a triangular cross-section and having two apices of the triangle at said parting lines and the third apex remote therefrom proximately to one of said side panel units, said spar bearing caps at said apices, stringers extending on said panel units at and along said parting lines in juxtaposition to each other and in opposition to two of said spar caps thereat, a stringer extending on one of said side panel units in opposition to the spar third cap, linear keys interposed between said stringers and said spar caps, said stringers and said caps having lengthwise portions in a slidable engagement with said keys, and means on said stringers and on said spar caps for rendering them and said panel units immobile relatively to each other and to said spar while being in engagement with said keys.

14. In an airfoil structure, one panel unit forming a closed profile extremity of a shell, two panel units meeting said closed extremity panel unit at spanwise parting lines on the shell opposite sides, a spar extending spanwise interjacent said parting lines, outriggers projecting from said spar into the shell other profile extremity and terminating as hinge brackets therein, stringers extending spanwise on the top and bottom of said outriggers at said brackets, stringers extending on said panel units at and along said parting lines in juxtaposition to each other and in opposition to said spar, stringers extending on said side panel units in opposition to said outrigger stringers, linear keys interposed between said stringers at said parting lines and said spar and between said panel unit and outrigger stringers, said stringers and said spar having lengthwise portions in a slidable engagement with said keys, and means for rendering said stringers in juxtaposition, said stringers and spar, and said stringers in opposition relatively immobile while said key-engagement portions thereof are in engagement with said keys.

15. In an airfoil structure, one panel unit forming a closed profile extremity of a shell, two panel units meeting said closed extremity panel unit at spanwise parting lines on the shell opposite sides, chordwise bulkheads in said shell, means attaching a first one of said side panel units to said bulkheads, stringers extending on said panel units at and along said parting lines in juxtaposition to each other, stringers extending on the other one of said side panel units at intervals apart from said parting line stringers, a stringer extending on said bulkheads in opposition to said panel unit stringers in juxtaposition pertaining to said closed extremity panel unit and to said other side panel unit, stringers extending on said bulkheads in opposition to said other side panel unit stringers apart from said parting line stringers, linear keys interposed between said panel unit stringers in juxtaposition at one parting line and between said panel unit and bulkhead stringers in opposition at the other parting line and between said side panel unit and bulkhead stringers in opposition, said stringers having lengthwise portions in a slidable engagement with said keys, and means on said stringers for rendering them and the panel units thereof immobile relatively to each other and to said bulkheads while being in engagement with said keys.

16. In an airfoil structure, components and their relationships as set forth in claim 15, said means attaching said first one of said side panel units to said bulkheads including, stringers on said first side panel unit at intervals apart from said parting line stringers in juxtaposition, stringers on said bulkheads in opposition to said stringers in juxtaposition and to said stringers apart therefrom on said first side panel unit, linear keys interposed between said side panel unit and bulkhead stringers, one of said bulkhead stringers having lengthwise portions in a slidable engagement with the key between said panel unit stringers in juxtaposition jointly with said stringers, said side panel and bulkhead stringers in opposition apart from said parting line having lengthwise portions in a slidable engagement with said keys therebetween, and means on said stringers for rendering them and the panel units thereof immobile relatively to each other and to said bulkheads while being in engagement with said keys.

17. In an airfoil structure, components and their relationships as set forth in claim 15, said bulkheads projecting into said shell closed extremity panel unit, a stringer extending spanwise on said bulkheads in said panel unit, a stringer intervening between the opposite sides of said panel unit in opposition to said bulkhead stringer, a linear key interposed between the two stringers, said stringers having lengthwise portions in a slidable engagement with said key, and means on said stringers for rendering them and the respective panel unit and bulkheads relatively immobile while being in engagement with said key.

18. In a shell structure, two panel units providing the opposite shell sides, chordal ribs extending at intervals apart from each other on at least one of said panel units, stringers extending lengthwise at intervals on said ribs and forming a framework therewith, stringers extending on the other panel unit in opposition to said framework stringers, linear keys interposed between said stringers in opposition, said stringers having lengthwise portions in a slidable engagement with said keys, and means on said stringers for rendering them and said panel units thereof relatively immobile while said key-engagement portions thereof are in engagement with said keys.

19. In an airfoil structure, one panel unit forming a closed profile extremity of a shell, two panel units meeting said closed extremity panel unit at spanwise parting lines on the shell opposite sides, a supporting framework of stress members in said shell, means attaching said framework to a first one of said side panel units, stringers extending on said panel units in juxtaposition to each other at and along said parting lines, at least one stringer extending on the other one of said side panel units apart from the parting line thereof, one of said framework members extending in opposition to said stringers in juxtaposition at said parting line, another framework member extending in opposition to said stringer apart from said parting line, linear keys interposed between said stringers in juxtaposition at the parting line of said first panel unit and between said stringers in juxtaposition and said framework member in opposition thereto at said other side panel unit parting line and between said stringer and framework member apart from said parting line, said stringers and said framework members having lengthwise portions in a slidable engagement with said keys, and means on said stringers and on said framework members for rendering them and said panel units immobile relatively to each other and to said framework while said key-engagement portions thereof are in engagement with said keys.

20. In an airfoil structure, components and their relationships as set forth in claim 19, said means attaching said first side panel unit to said framework including, at least one stringer extending on said first side panel unit apart from the parting line thereof and from said stringers in juxtaposition thereat, a framework member extending in opposition to said stringers in juxtaposition at said parting line and along the key interposed therebetween, another framework member extending in opposition to said first side panel unit stringer apart from said parting line thereof, a linear key interposed between said stringer and said framework member, said framework member at said parting line having lengthwise portions in a slidable engagement with said key thereat jointly with said stringers in juxtaposition, said stringer and framework member having lengthwise portions in a slidable engagement with said key therebetween, and means on said stringers and on each framework member in opposition thereto for rendering them and said panel units immobile relatively to each other and to said framework while said key-engagement portions thereof are in engagement with said key.

21. In an airfoil structure, one panel unit forming a closed profile extremity of a shell, two panel units meeting said closed extremity panel unit at spanwise parting lines on the shell opposite sides, a number of spars in said shell having caps on their profile ends, the first of said spars being interjacent said parting lines and the others of said spars being inclined to have the caps thereof meet with one of the caps of said first spar and with each other's caps, stringers extending on said panel units at and along said parting lines in juxtaposition to each other and in opposition at one parting line to one cap of said first spar and to the meeting caps of said first spar and the second spar at the other parting line, stringers extending on said side panel units in opposition to the meeting caps of said spars apart from said parting lines and to one cap of the rearmost of said spars, linear keys interposed between said stringers and spar caps in opposition, said stringers and said caps having lengthwise portions in complemental engagement of the number thereof with said keys, and means for rendering said stringers and caps and the respective panel units and spars thereof relatively immobile while said key-engagement portions thereof are in engagement with said keys.

22. In an airfoil structure, one panel unit forming a closed profile extremity of a shell, two panel units meeting said closed extremity panel unit at spanwise parting lines on the shell opposite sides, means on said side panel units and therebetween for securing them detachably as parts of said shell at the other profile extremity thereof, a supporting member interjacent said parting lines and bearing caps in a spaced relationship to said panel units thereat, stringers extending on said panel units at and along said parting lines in juxtaposition to each other and in opposition to said supporting member caps, linear keys interposed between said stringers in juxtaposition and said caps, said stringers and caps having lengthwise portions in a slidable engagement with said keys, and means on said stringers and on said caps for rendering said stringers and panel units thereof immobile relatively to each other and to said supporting member while said key-engagement portions thereof are in engagement with said keys.

23. In an airfoil structure, components and their relationships as set forth in claim 22, said means for securing said side panel units detachably as parts of said shell including, stringers extending on said side panel units apart from said parting lines thereof in opposition to each other, a linear key interposed between said stringers, said stringers having lengthwise portions in a slidable engagement with said key, and means on said stringers for rendering them and said panel units thereof relatively immobile while said key-engagement portions thereof are in engagement with said key.

24. In an airfoil structure, one panel unit forming a closed profile extremity of a shell, two panel units meeting said closed extremity panel unit at spanwise parting lines on the shell opposite sides, an inner shell paralleling a first one of said side panel units in a spaced relation thereto, a stringer extending on said inner shell at and along the parting line of said first side panel unit, stringers extending on said inner shell along said first side panel unit at intervals apart from said parting line stringer, stringers extending on said panel units at and along said parting lines in juxtaposition to each other and at one parting line in opposition to said inner shell stringer, stringers extending on said first side panel unit in opposition to said inner shell stringers apart from said parting line, linear keys interposed between said stringers in juxtaposition and said stringers in opposition on said panel units and inner shell, said stringers having lengthwise portions in a slidable engagement with said keys, and means on said stringers for rendering said panel units immobile relatively to each other and to said inner shell while said key-engagement portions thereof are in engagement with said keys.

25. In an airfoil structure, components and their relationships as set forth in claim 24, said inner shell paralleling the other side panel unit in a spaced relationship thereto, a stringer extending on said inner shell in opposition to said stringers in juxtaposition at the parting line of said other side panel unit, stringers extending on said inner shell along said other side panel unit at intervals apart from said parting line stringer, stringers extending on said other side panel unit in opposition to said inner shell stringers apart from said parting line, linear keys interposed between said panel unit and inner shell stringers in opposition, said stringers having lengthwise portions in a slidable engagement with said keys, and means on said stringers for rendering said side panel units immobile relatively to each other and to said inner shell while said key-engagement portions thereof are in engagement with said keys.

No references cited.